United States Patent Office 3,028,352
Patented Apr. 3, 1962

3,028,352
NEOPENTYL GLYCOL ALKYL PHTHALATES AND POLYVINYL CHLORIDE COMPOSITIONS PLASTICIZED THEREWITH
Arthur C. Hecker, Forest Hills, and Mark W. Pollock and Iocheved Rabinovici, New York, N.Y., assignors to Argus Chemical Corporation, Brooklyn, N.Y., a corporation of New York
No Drawing. Filed July 1, 1960, Ser. No. 40,180
9 Claims. (Cl. 260—31.6)

This invention relates to neopentyl glycol alkyl esters of phthalic acids and polyvinyl chloride resins plasticized therewith. Esters of certain glycols with o-phthalic acid and with numerous dibasic aliphatic acids have been proposed heretofore for use in plasticizing polyvinyl chloride resins. These glycol esters, as compared to the widely used alkyl esters such as dioctyl phthalate have the advantage of extremely low volatility. They have the disadvantages, however, of being more costly, less active solvents and therefore requiring more time to dissolve the polyvinyl chloride during the usual hot-roll compounding, and subject to excessive staining with various colored compositions that may accidentally come into contact with articles made from the finished plastic composition.

Our new esters retain the advantage of low volatility. At the same time, they avoid or decrease greatly the disadvantages previously encountered in the attempted use of the glycol dibasic acid esters and make possible plastic compositions having desirable properties normally considered contradictory. Thus our new plasticizers, when incorporated into polyvinyl chloride resins, become sufficiently hydrophobic to be less extractable by water and also sufficiently lipophobic to be less extractable by oils than the dialkyl phthalates such as dioctyl phthalate. They produce plasticized polyvinyl chloride of high strength at testing temperatures (showing less active solvent power) than for comparable dioctyl phthalate stock with the same proportion of the plasticizer. Yet our esters, on the other hand, dissolve or compound with the polyvinyl chloride on the heated mixing rolls several times as fast as representative conventional esters of glycols with dibasic acids and at a rate at least approximately as fast as dioctyl phthalate.

Briefly stated, the present invention comprises the mixed ester of a phthalic acid with neopentyl glycol and a $C_1$–$C_{10}$ monohydric aliphatic alcohol. The mixed ester has the type formula:

$$ROOC-C_6H_4-COO-CH_2-\underset{\underset{CH_3}{|}}{\overset{\overset{CH_3}{|}}{C}}-CH_2-(OOC-C_6H_4-COO-CH_2-\underset{\underset{CH_3}{|}}{\overset{\overset{CH_3}{|}}{C}}-CH_2)_nOOC-C_6H_4-COOR$$

in which R represents a $C_1$–$C_{10}$ alkyl group and $n$ an integral number within the range 0–1. When $n$ is higher, as, for example, 2 or 3, the product is too viscous for most uses. When $n=0$, the formula becomes:

$$ROOC-C_6H_4-COO-CH_2-\underset{\underset{CH_3}{|}}{\overset{\overset{CH_3}{|}}{C}}-CH_2-OOC-C_6H_4-COOR$$

The invention comprises also a plastic composition including a polyvinyl chloride resin and an ester of the kind described compounded so as to plasticize the ester.

As to materials, the polyvinyl chloride resin used may be any one of the conventional polyvinyl chloride resins. Examples that meet the requirements and illustrate the class to be used are the commercial homopolymers of polyvinyl chloride, one of the examples of which is known as Geon 101–EP, and copolymers of vinyl chloride with vinyl acetate, styrene, vinylidene chloride, and methyl, ethyl, and other $C_1$–$C_{10}$ alkyl esters of maleic and fumaric acid. In the copolymer selected, the vinyl chloride predominates over the proportion of material copolymerized therewith. Thus we may use copolymers in which the proportion of vinyl chloride is at least 70% of the total weight of the vinyl chloride and vinyl acetate or other ethylenic bond material copolymerized with the vinyl chloride.

The phthalic acid represented in the ester is any available commercial variety, as for example phthalic anhydride or iso- or terephthalic acid.

In obtaining our combination of normally opposed properties, we know of no substitute that may be used for the phthalic acids or for the neopentyl glycol, the latter being of the formula:

$$HOCH_2-\underset{\underset{CH_3}{|}}{\overset{\overset{CH_3}{|}}{C}}-CH_2OH$$

The monohydric aliphatic alcohol used is any $C_1$–$C_{10}$ alcohol. Examples are ethanol, n-propanol, isopropanol, n-butanol, isobutanol, tert-butanol, n-hexanol, isohexanol, octanol, isooctanol, tert-octanol, 2-ethylhexanol and n-decanol. The alcohol used is ordinarily saturated. Alcohols containing more than about ten carbon atoms to the molecule are not used unless they are sufficiently branched to make the resulting neopentyl glycol alkyl ester a liquid at room temperatures.

As esterification catalyst we use any material that is commonly employed for this purpose as for example an acid and suitably a small proportion of p-toluenesulfonic, sulfuric, or phosphoric acid.

The alkali used to neutralize the catalyst, after the esterification is completed, is any alkali conventionally used for this purpose, as for instance sodium or potassium carbonate, precipitated calcium carbonate, or barium hydroxide. Sodium and potassium carbonates are satisfactory and convenient and are the alkalies that we ordinarily use.

Any stabilizer may be used of kind and in proportion that is conventional for the resin.

As to proportions, the neopentyl glycol and the monohydric alcohol are suitably used in total amount to provide a slight excess over the phthalic acid and thus promote substantially complete esterification of the acid.

We use 2 moles of the monohydric alcohol for 1 mole of the phthalic acid. We use also 1 mole of the neopentyl glycol for each additional mole of the phthalic acid. Thus with 3 moles total of phthalic acid (or phthalic anhydride) we use 2 moles of the monohydric alcohol and 2 moles of the glycol. It is convenient to use a small excess of the monohydric alcohol above the proportion stated, which excess is easily removed by distillation after termination of the esterification.

The catalyst of esterification is used in proportion that is common for this type of material in esterification reactions. Suitable proportions are 0.1%–5% of the weight of the phthalic acid and ordinarily about 1%–3%.

In making our esters, we mix the phthalic component, as in the form of the commercial anhydride, with the neopentyl glycol, the $C_1$–$C_{10}$ monohydric aliphatic alcohol, and the acid catalyst of esterification. Also, it is convenient to introduce a water-immiscible organic liquid such as hexane, toluene, or xylene, for removal of water as formed in the esterification, by azeotropic distillation. The whole is then refluxed. Some of the vapors are allowed to condense above a water trap and the hydrocarbon layer of azeotropic liquid collected in the trap is returned continuously to the still. When practically no more water distils over, as shown by the slow or negligible rate of further water collection in the trap, the esterification is considered complete. The apparatus used is conventional and, therefore, not illustrated.

The reaction product is next neutralized, as with a slight excess of alkali such as sodium carbonate or the like.

The remaining volatile material, which will be mostly the excess if any of the monohydric alcohol used and the azeotropic liquid, is then distilled away, finally with steam. The salt formed is solid and is removed by filtration, as at an elevated temperature.

The filtrate is the desired mixed ester of the type formula above. Besides, it includes minor proportions of neopentyl glycol phthalate and dialkyl phthalate, the alkyl group of latter and also of the mixed ester corresponding to the original monohydric alcohol used.

The invention will be further illustrated by description in connection with the following specific examples of it. In these examples and elsewhere herein, proportions are expressed as parts by weight unless specifically stated to the contrary.

EXAMPLE I

A mixture was made of 296 parts of o-phthalic anhydride (2 moles or 4 equivalents), 104 of neopentyl glycol (1 mole or 2 equivalents), 286 of isooctanol (2.2 moles, 7.5 of p-toluene sulfonic acid as esterification catalyst, and 40 of hexane for azeotropic distillation of water formed in the subsequent esterification.

The whole was heated and refluxed as described, finally to a temperature in the esterification mix of 125° C. The heating to this maximum temperature was continued until substantially no more water was formed in the reaction and until a sample, withdrawn from the reaction mix, showed an acid number below 3, this condition being reached after about ten hours of heating.

The hot mixture was then neutralized with 2.8 parts of anhydrous potassium carbonate. The volatile components, including the hexane and the excess, i.e. unesterified isooctanol, were then removed by steam distillation.

The salts formed by the reaction of the alkali were next separated by filtering the hot liquid from the solid salts.

The product obtained was essentially neopentyl glycol isooctyl phthalate. It showed by test specific gravity 1.050 at 25° C., $n_D^{25}$ 1.504, Brookfield viscosity 2000 cps. at 25° C., and average molecular weight approximately 680.

EXAMPLE II

The procedure of Example I was followed, except that the proportions used were 444 parts of o-phthalic anhydride (3 moles), 208 of neopentyl glycol (2 moles), 350 of decyl alcohol (approximately 2.2 moles), 12 of p-toluenesulfonic acid, and 80 of hexane.

The ester remaining after the filtration described was more viscous than the final product of Example I and had specific gravity 1.075 at 25° C., $n_D^{25}$ 1.509, Brookfield viscosity 22,000 cps. 25° C., and average molecular weight approximately 1000.

In both Examples I and II, the monohydric alcohol terminates the ester chain.

EXAMPLE III

A mixture was made of 237 parts of o-phthalic anhydride, 83.5 parts of neopentyl glycol, 131 parts of n-butanol and 6.7 parts of p-toluene sulfonic acid as esterification catalyst, and 50 parts of hexane for azeotropic distillation of water formed in the subsequent esterification.

The whole was heated and refluxed as described, finally to a temperature in the esterification mix of 125° C. The heating to this maximum temperature was continued until substantially no more water was formed in the reaction and until a sample, withdrawn from the reaction mix, showed an acid number below 4.7, this condition being reached after about ten hours of heating.

The hot mixture was then neutralized with 2.8 parts of anhydrous potassium carbonate. The volatile components, including the hexane and the excess, i.e., unesterified n-butanol were then removed by steam distillation.

The salts formed by the reaction of the alkali were next separated by filtering the hot liquid from the solid salts.

The product obtained was essentially neopentyl glycol n-butyl phthalate. It showed by test an average molecular weight of approximately 550.

EXAMPLE IV

A mixture was made of 237 parts of o-phthalic anhydride, 83.5 parts of neopentyl glycol, 105.6 parts of n-propanol, 6.7 parts of p-toluene sulfonic acid as esterification catalyst, and 50 parts of hexane for azeotropic distillation of water formed in the subsequent esterification.

The whole was heated and refluxed as described, finally to a temperature in the esterification mix of 125° C. The heating to this maximum temperature was continued until substantially no more water was formed in the reaction and until a sample, withdrawn from the reaction mix, showed an acid number below 4.7, this condition being reached after about ten hours of heating.

The hot mixture was then neutralized with 2.8 parts of anhydrous potassium carbonate. The volatile components, including the hexane and the excess, i.e., unesterified n-propanol were then removed by steam distillation.

The salts formed by the reaction of the alkali were next separated by filtering the hot liquid from the solid salts.

The product obtained was essentially neopentyl glycol n-propyl phthalate. It showed by test an average molecular weight of approximately 525.

EXAMPLE V

The procedure of Example I or Example II is followed except that the phthalic anhydride is replaced by iso- or terephthalic acid in equimolecular ratio, the monohydric alcohol by any of the other monohydric alcohols disclosed herein, and the catalyst of esterification and the azeotropic liquid by any other materials disclosed herein for these purposes, respectively.

EXAMPLE VI

For demonstration of the physical properties of plastics including our new plasticizer, polyvinyl chloride (100% polyvinyl chloride, Geon 101–EP) was compounded on heating rolls that are usual in polyvinyl chloride compounding the rolls were maintained at 330° F. More specifically, the equipment used was a conventional 2-roll mill. A small proportion of the stabilizer was introduced, the stabilizer in this instance being 1 part of barium cadmium laurate for 100 of polyvinyl chloride. Any other usual stabilizer for polyvinyl chloride resins may be substituted for the laurate since the stabilization of our compositions is conventional and is not affected in any substantial way by the change from usual plasticizers to our new mixed esters.

Since relatively large proportions of our plasticizers are permissible without such excessive softening as to produce weak plastics after cooling, we tried several proportions of the plasticizers. Thus, we used 50–75 parts of the final product of Example I, namely, the neopentyl glycol isooctyl phthalate, for 100 of the polyvinyl chloride. The resulting compositions were then compared with a plastic made in strictly comparable manner with the same polyvinyl chloride resin, the same stabilizer, and dioctyl phthalate in the proportion of 50 parts for 100 of the resin.

Certain features of our plasticized polyvinyl material were compared also with properties obtained with the various glycol esters containing no alkyl component and with other plasticizers.

Rate of Compounding

The rate of solution or compounding of the plasticizer with the polyvinyl chloride resin on the 2-roll mill at the 330° F. was first noted. It is expressed as time in minutes required to produce a continuous homogeneous sheet of plastic on a hot roll and compared with the times for other plasticizer materials in the table below. In all these tests, conditions were comparable and the proportion of plasticizer used was 50 parts for 100 of the Geon 101–EP.

TABLE I

| Plasticizer Used | Time, Minutes, to Produce Homogeneous Sheet |
|---|---|
| Propylene glycol sebacate | 15 |
| Ester product of Example I | 2 |
| Ester product of Example II | 2 |
| Ester product of Example III | 2 |
| Ester product of Example IV | 2 |
| Dioctyl phthalate | 2 |
| Propylene glycol adipate chain ended with lauric acid | 6 |

Tensile Strength and Hardness

In spite of the rapid rate of solution or colloiding of the polyvinyl chloride by our mixed ester at roll temperatures, the finished plastic composition when cold shows the feasibility of using larger proportions of the plasticizer than of dioctyl phthalate without such excessive softening or weakening as to destroy adequate tensile strength and hardness.

In the following table these properties are compared for the standard plasticizer dioctyl phthalate and the various proportions of the neopentyl glycol phthalate esters of Examples I, II, III and IV. All proportions are expressed as parts for each 100 parts of the polyvinyl chloride.

TABLE II

| Plasticizer | Parts | Tensile Strength, p.s.i. | Elongation, Percent | Modulus at 100% Elongation | Shore A Hardness, Immediate |
|---|---|---|---|---|---|
| Dioctyl phthalate | 50 | 2,440 | 335 | 1,470 | 88 |
| Example I product | 50 | 2,730 | 290 | 2,280 | 100 |
| Do | 60 | 2,605 | 340 | 1,840 | 96 |
| Do | 68 | 2,415 | 365 | 1,470 | 93 |
| Do | 75 | 2,180 | 365 | 1,205 | 88 |
| Example II product | 73 | 2,390 | 360 | 1,450 | 93 |
| Example III product | 60 | 2,700 | 320 | 1,950 | 97 |
| Example IV product | 60 | 2,700 | 300 | 2,000 | 99 |

Evaporation Rate

Volatility tests were made on polyvinyl chloride resin containing 50 parts of the plasticizer for each 100 parts of the resin. The tests were carried out at 120° C. for twenty-four hours with the following results:

Plasticizer: Loss, percent
- Dioctyl phthalate _____ 5.82
- Example I product _____ 2.67
- Example III product _____ 3.5
- Example IV product _____ 4.5

Extractability

Using the same compositions as tabulated immediately above and comparing the extractability with water in a seven day test at 50° C., the sample with 50 parts dioctyl phthalate was found to show a loss in weight equivalent to 0.57% of the total plastic. With the same proportion of the plasticizer of Example I, the loss was 0.36%. With the product of Example II using the proportion of 73 parts of the extraction, the loss was only 0.41% in spite of the larger proportion of plasticizer in the sample tested.

Extraction by a light lubricating oil in seven days at 50° C. gave weight losses of 0.57%, 0.36% and 0.51% for the dioctyl phthalate, Example I, and Example II products, respectively.

Stain Resistance

Extensive testing of stain resistance at proportions of the plasticizer corresponding to 40, 50, 60 and 70 parts for 100 of the polyvinyl chloride resin shows the superiority of the polyvinyl compositions plasticized with neopentyl glycol alkyl phthalate over other plasticizers for a large proportion of the common stains against which resistance is particularly desirable. The following table shows the data only for a representative proportion, namely, for the plastic containing 50 parts of the plasticizer for 100 of the resin, here VYNW, a copolymer of 96 parts of vinyl chloride with 4 of vinyl acetate.

The stabilizer used was 1% of barium cadmium laurate. A white color, to make the staining more conspicious, was established by the admixture of 5 parts of titanium dioxide pigment thoroughly in the plastic.

The selected staining agent was coated on the plastic in sheet form, and the thus coated plastic was maintained in an oven at 120° F. for twenty hours. The coating was then wiped off in the case of staining agents with a water base, or was washed off with mineral spirits when the staining composition used had an oil base. The residual stain or staining effect was then observed and rated as follows:

1—no stain
2—very slight stain
3—slight stain
4—moderate stain
5—severe stain

The staining results follow:

TABLE III

[Extent of staining with various plasticizers used (50 parts/100 VYNW)]

| Kind of Stain | Product of Ex. I | Product of Ex. III | Product of Ex. IV | Didecyl phthalate | Neopentyl glycol adipate [1] | Epoxidized Soybean oil |
|---|---|---|---|---|---|---|
| Asphalt | 1 | 1 | 1 | 4 | 3 | 3 |
| Black shoe polish (Esquire) | 3 | 2 | 2 | 4 | 5 | 5 |
| Mustard (French's yellow) | 3 | 2 | 2 | 5 | 5 | 4 |
| Red crayon | 3 | 1 | 1 | 2 | 3 | 3 |
| Ball point ink | 1 | 1 | 1 | 2 | 2 | 3 |
| Lipstick (Revlon regular) | 3 | 2 | 2 | 5 | 5 | 5 |
| Average of ratings | 2.3 | 1.5 | 1.5 | 3.7 | 3.8 | 3.8 |

[1] Chain terminated with 2-ethylhexanol.

Superior stain resistance of the plastics containing the Examples I, II, III and IV materials was found also by comparative tests against the following plasticizers: butyl benzyl phthalate, dipropylene glycol dibenzoate, 2-ethylhexanediol adipate (chain terminated with 2-ethylhexanol), and propylene glycol adipate (chain terminated with pelargonic acid). In only three tests out of twenty-four, made with the 50 parts of plasticizer for 100 of resin, was our new plasticizer of Example I not at least equal in stain resistance to any other plasticizer. Only in resistance to the red crayon was any other plasticizer superior to our ester. Stain resistance is high also in the case of our other neopentyl glycol alkyl esters.

It is to be understood that it is intended to cover all changes and modifications of the Examples of the invention herein chosen for the purpose of illustration which do not constitute departures from the spirit and scope of the invention.

This application is a continuation-in-part of U.S. Serial No. 679,538, filed August 21, 1957, and now abandoned.

We claim:

1. A neopentyl glycol alkyl phthalate ester of the formula:

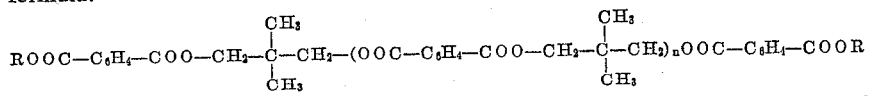

in which R represents a $C_1-C_{10}$ alkyl group and $n$ an integral number within the range 0–1.

2. A neopentyl glycol alkyl phthalate ester of the formula:

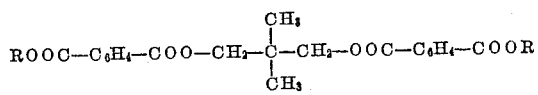

in which R represents a $C_1-C_{10}$ alkyl group.

3. The ester of claim 1 in which $n$ is 1.
4. The ester of claim 1 in which the ester is derived from o-phthalic acid.
5. The ester of claim 1 in which R represents an alkyl group containing eight carbon atoms.
6. The ester of claim 1 in which R represents a butyl group.
7. The ester of claim 1 in which R represents a propyl group.
8. The ester of claim 2 in which R represents decyl.
9. A plastic composition comprising a polyvinyl chloride resin and the ester of claim 1 compounded therewith and serving as plasticizer therefor in the proportion of about 20 to about 125 parts of the said ester for each 100 parts of the polyvinyl chloride resin.

References Cited in the file of this patent

UNITED STATES PATENTS

| | | |
|---|---|---|
| 2,075,107 | Frazier | Mar. 30, 1937 |
| 2,643,989 | Auspos et al. | June 30, 1953 |

OTHER REFERENCES

Koroly et al.: Polymeric Plasticizers; I and E Chem., May 1953, pages 1060–1063, volume 45, No. 5.